S. T. SAVAGE.
Coffee Pot.
No. 101,517. Patented April 5, 1870.
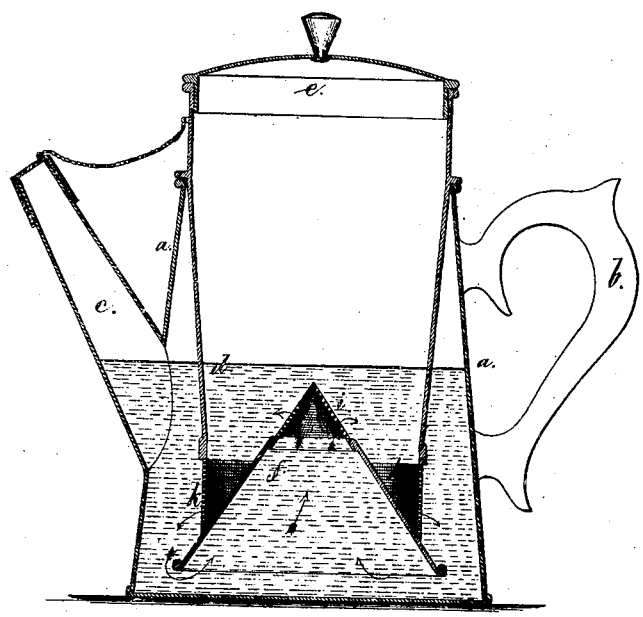
Witnesses,
Chas H Smith
Geo. D Walker.
Silas T. Savage.
per Lemuel W. Serrell
Atty.

United States Patent Office.

SILAS T. SAVAGE, OF BROOKLYN, NEW YORK, ASSIGNOR TO HIMSELF AND DAVID S. QUIMBY, JR., OF SAME PLACE.

Letters Patent No. 101,517, dated April 5, 1870.

IMPROVEMENT IN COFFEE-POTS.

The Schedule referred to in these Letters Patent and making part of the same

*To all whom it may concern:*

Be it known that I, SILAS T. SAVAGE, of Brooklyn, in the county of Kings and State of New York, have invented an Improvement in Pots for Coffee, &c., and the following is declared to be a correct description of the same.

Before my invention, pots and boilers had been made in which the liquid circulated up through a pipe, and descended again to the bottom, and in a coffee-pot invented and patented by me June 15, 1869, No. 91,274, a rising pipe is provided within a coffee-holding vessel, but in this case I find that the heat has to be increased when the quantity of liquid is lessened, in order to maintain a rapid circulation.

My present invention is an improvement upon the aforesaid Letters Patent, and consists in a conical ebullition-director, with a perforated cap introduced at the bottom of the coffee-holder, in combination with perforations around the perimeter of such coffee-holder, or near the bottom thereof, so that the heat will cause an ascending circulation through the conical ebullition-director, returning through the coffee-holder and the perforations near the bottom thereof.

By this means the soluble matter will be extracted from the coffee or other material with rapidity, and the circulation will be maintained when the pot is nearly emptied, or when it is filled.

In the drawing I have shown a vertical section of the said coffee-pot.

The exterior vessel $a$ is of any desired size or shape, and provided with the handle $b$ and spout $c$.

The coffee-holder is made of the inner case $d$, sitting within the vessel $a$, and provided with the cover $e$.

At the bottom of the case $d$ is a cone, $f$, the upper portion or apex of which is perforated or provided with a perforated cap at $i$, and other perforations are provided near the junction of the case $d$ and cone $f$, as at $k$.

The circulation is effected as indicated by the arrows, the ebullition being directed, by the cone $f$, through the perforations $i$, and the coffee or other material in the case or holder $d$; thence the liquid returns through the holes $k$ into the vessel $a$.

I claim as my invention—

The ebullition-director $f$, perforations or cap $i$, case $d$, and perforations $k$, in combination with the vessel $a$, as and for the purpose set forth.

Signed by me this third day of March, A. D. 1870.

S. T. SAVAGE.

Witnesses:
    CHAS. H. SMITH,
    GEO. T. PINCKNEY.